United States Patent
Heiney et al.

(10) Patent No.: US 8,924,842 B2
(45) Date of Patent: Dec. 30, 2014

(54) METHOD AND SYSTEM TO BUILD INTERACTIVE DOCUMENTS

(75) Inventors: Ronald Lee Heiney, Harrodsburg, KY (US); Byron S. Pruitt, Lexington, KY (US); Matthew F. Ryavec, Lexington, KY (US); Anastasiya Aleksandrovna Zdzitavetskaya, Lexington, KY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 287 days.

(21) Appl. No.: 13/035,737

(22) Filed: Feb. 25, 2011

(65) Prior Publication Data

US 2012/0221933 A1      Aug. 30, 2012

(51) Int. Cl.
  *G06F 17/21*     (2006.01)
  *G06F 17/30*     (2006.01)
  *G06F 17/24*     (2006.01)
  *G06Q 10/10*     (2012.01)

(52) U.S. Cl.
  CPC ........ *G06F 17/246* (2013.01); *G06F 17/30011* (2013.01); *G06Q 10/10* (2013.01)
  USPC ........................................................ 715/212

(58) Field of Classification Search
  CPC ............................. G06F 17/212; G06F 17/246
  USPC .................................................. 715/221, 212
  See application file for complete search history.

(56) References Cited

U.S. PATENT DOCUMENTS

| | | | |
|---|---|---|---|
| 5,956,736 A * | 9/1999 | Hanson et al. ................ 715/234 |
| 5,983,268 A * | 11/1999 | Freivald et al. ............... 709/218 |
| 6,701,485 B1 * | 3/2004 | Igra et al. ...................... 715/210 |
| 7,117,435 B1 * | 10/2006 | Kotler et al. ................... 715/210 |
| 7,120,866 B2 * | 10/2006 | Kotler et al. ................... 715/209 |
| 7,225,189 B1 * | 5/2007 | McCormack et al. ................. 1/1 |
| 7,281,018 B1 * | 10/2007 | Begun et al. ........................... 1/1 |
| 7,523,390 B2 * | 4/2009 | Kotler et al. ................... 715/212 |
| 7,523,395 B1 * | 4/2009 | Namait et al. ................. 715/255 |
| 7,702,997 B2 * | 4/2010 | Kotler et al. ................... 715/209 |
| 7,779,431 B2 | 8/2010 | Wallace |
| 8,117,552 B2 * | 2/2012 | Paoli et al. ..................... 715/763 |
| 2004/0044954 A1 * | 3/2004 | Hosea ............................ 715/503 |
| 2004/0088650 A1 * | 5/2004 | Killen et al. ................... 715/503 |
| 2004/0117731 A1 * | 6/2004 | Blyashov ....................... 715/507 |
| 2005/0071349 A1 * | 3/2005 | Jordan et al. .................. 707/100 |
| 2005/0171934 A1 * | 8/2005 | Yuknewicz et al. ............... 707/3 |

(Continued)

OTHER PUBLICATIONS

Wolber et al., Designing Dynamic Web Pages and Persistence in the Wysiwyg Interface, ACM, IUI '02, Jan. 13-16, 2002, p. 228-229.*

(Continued)

*Primary Examiner* — Frank D Mills
(74) *Attorney, Agent, or Firm* — Garry A. Perry

(57) ABSTRACT

In one embodiment, during a design mode an editing interface is provided, the interface including a plurality of cells arranged in a layout. An instruction is received to cause binding of a widget to a first cell, and data is received at the first cell. During a production mode, a view of the document is displayed. The first cell is updated to reference changed data when it is detected that data within the widget is changed via user input at the widget. The widget is updated to reference changed data when it is detected that data within the first cell has changed for a reason other than user input at the widget.

19 Claims, 9 Drawing Sheets

(56) References Cited

U.S. PATENT DOCUMENTS

| | | | |
|---|---|---|---|
| 2006/0101391 A1* | 5/2006 | Ulke et al. | 717/107 |
| 2006/0112123 A1* | 5/2006 | Clark et al. | 707/101 |
| 2006/0150085 A1* | 7/2006 | Davis et al. | 715/513 |
| 2007/0028159 A1* | 2/2007 | Ying et al. | 715/503 |
| 2007/0050697 A1* | 3/2007 | Lewis-Bowen et al. | 715/503 |
| 2007/0168930 A1* | 7/2007 | Mirkazemi et al. | 717/104 |
| 2008/0046804 A1* | 2/2008 | Rui et al. | 715/212 |
| 2008/0065634 A1* | 3/2008 | Krinsky | 707/6 |
| 2009/0089653 A1* | 4/2009 | Campbell et al. | 715/209 |
| 2009/0094538 A1* | 4/2009 | Ringler | 715/760 |
| 2010/0131482 A1* | 5/2010 | Linthicum et al. | 707/706 |
| 2010/0156889 A1* | 6/2010 | Martinez et al. | 345/418 |
| 2010/0332973 A1 | 12/2010 | Kloiber et al. | |
| 2011/0099466 A1* | 4/2011 | Matveief et al. | 715/224 |
| 2011/0145297 A1* | 6/2011 | Singh | 707/802 |

OTHER PUBLICATIONS

Lowery, Adobe Dreamweaver CS5 Bible, John Wiley & Sons, Jun. 1, 2010, p. 755-776; 793-810.*

"Interactive Documents Get Smarter; The Next Dimension of 1 to 1 Communications"; Peppers & Rogers Group; 2007; 10 pages.

Cheetancheri, Kabileshkumar G., et al.; "Spreadsheet-based Interactive Design and Analysis of Mechanisms Using Excel and Ch"; 2009; on pp. 274-280.

Girgensohn, Andreas, et al.; "Seamless Integration of Interactive Forms Into the Web"; 12 pages.

Hudson, Scott E.; "User Interface Specification Using an Enhanced Spreadsheet Model"; Georgia Insitute of Technology, Atlanta; Jul. 1994; Voly 13, pp. 209-239.

Resseguie, David Robert; "Developing a Software Tool for Creating Interactive Electronic Forms Using the Spreadsheet Paradigm"; University of Tennessee-Knoxvile; Dec. 13, 2011; 13 pages.

Sinex, Scott A.; "Developer's Guide to Excelets: Dynamic and Interactive Visualization with "Javaless" Applets or Interactive Excel Spreadsheets"; Prince George's Community College; Apr. 2010; 5 pages.

"Adobe Flash Builder 4,5"; Adobe Systems Incorporation; 2011; 2 pages.

Heins, Tanya; "Getting Started With Adobe Flash Catalyst CS5"; Adobe Systems Incorporated; 2011; 23 pages.

* cited by examiner

Fig. 9

METHOD AND SYSTEM TO BUILD INTERACTIVE DOCUMENTS

BACKGROUND

An interactive document is an electronic document that includes embedded instructions and interactive elements to cause document content and/or properties changes as an end user interacts with the document. A designer user can utilize the instructions and interactive elements to create a dynamic document in the style of a form, letter, policy, proposal, memo, or other document type or structure. The interactive document can be created as a template, and customized for the end user's specific set of circumstances based upon that end user's interaction with the document. The interactive document frequently includes a built in workflow and business rules, and may provide instructional assistance to the end user to expedite the creation or completion of the document via the interactive elements.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

FIG. 9 illustrates an example external data source, according to an embodiment.

The same part numbers designate the same or similar parts throughout the figures.

DETAILED DESCRIPTION OF EMBODIMENTS

Creating and modifying an interactive document is frequently a complex task requiring an advanced knowledge of scripting and programming languages. For example, an interactive document solution might implement field calculations and validations of html forms with JavaScript, Visual Basic, and other scripting languages. In another example, creation of an interactive document may involve data binding that is defined programmatically. However, the primary users of the interactive documents are frequently business users that do not have advanced programming skills. Thus entities utilizing interactive documents often hire programmers to perform tasks such as creating instructions, defining functional logic, and specifying data binding to create, or modify, an interactive document. Another drawback to creating or modifying an interactive document utilizing scripting and programming languages is that a change to the functional logic or data binding within the document may require recompilation or redeployment of the document, or a debugging tool specific to the scripting languages used. All of these factors added complexity, time and cost to the interactive document creation process.

Embodiments described below were developed in an effort to provide a method and a system to build an electronic interactive document in a manner that allows a user to define functional logic and specify data binding without advanced programming or scripting language experience or tools. As used in this specification and the appended claims, to "build" an interactive document means to create, develop, or form the interactive document in one or in multiple sessions, and includes making modifications to an existing interactive document. Because the creation and modifying of the interactive document can now be performed by a designer user with a non-technical background, entities and individuals are more likely to create and utilize interactive documents applications and user satisfaction is increased.

The embodiments shown in the accompanying drawings and described below are non-limiting examples. Other embodiments are possible and nothing in the accompanying drawings or in this Detailed Description of Embodiments should be construed to limit the scope of the disclosure, which is defined in the Claims.

The following description is broken into sections. The first, labeled "Environment", describes an example environment in which embodiments may be implemented. The second section, labeled "Components", describes various physical and logical components utilized to implement various embodiments. The third section, labeled as "Operation", describes example embodiments of a method to build an interactive document. The fourth section, labeled "Example", describes an example of a display during a design mode, and an example of an external data source, according to embodiments of the disclosure.

Figure 1:
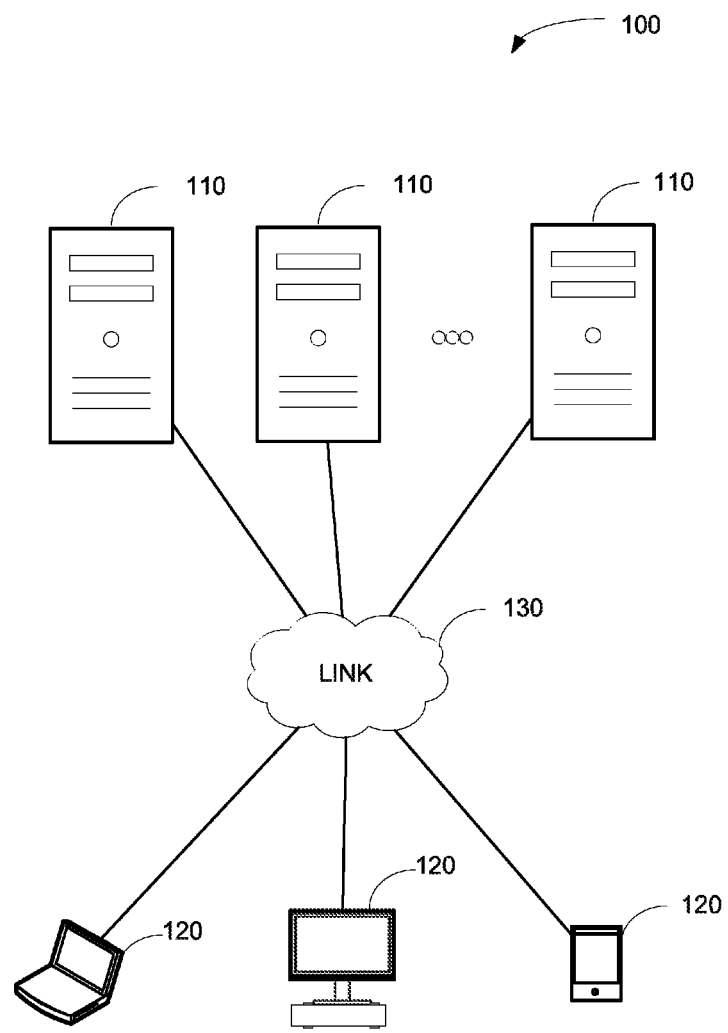
FIG. 1 depicts an example environment in which various embodiments may be implemented.

ENVIRONMENT: FIG. 1 depicts an example environment 100 in which various embodiments may be implemented. Environment 100 is shown to include servers 110 and computing devices 120.

Each of servers 110 represents generally one or more computing devices capable of receiving and responding to network requests from each other and/or other computing devices via a link 130. Network requests may be sent and received utilizing a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

Computing devices 120 each represent generally any computing device capable of communicating with a server 110 via a network. A computing device 120 may be a desktop computer, a laptop computer, or a mobile computing device. Example mobile computing devices include smart phones, personal digital assistants, tablet personal computers, and the like.

Computing devices 110 and 120 may be interconnected via link 130. Link 130 represents generally one or more of a cable, wireless, fiber optic, or remote connections via a telecommunication link, an infrared link, a radio frequency link, or any other connectors or systems that provide electronic communication. Link 130 may include, at least in part, the Internet, an intranet, or a combination of both. Link 130 may also include intermediate proxies, routers, switches, load balancers, and the like. The paths followed by link 130 between computing devices 110 and 120 and as depicted in FIG. 1 represent the logical communication paths between these devices, not necessarily the physical paths between the devices.

Figure 2:
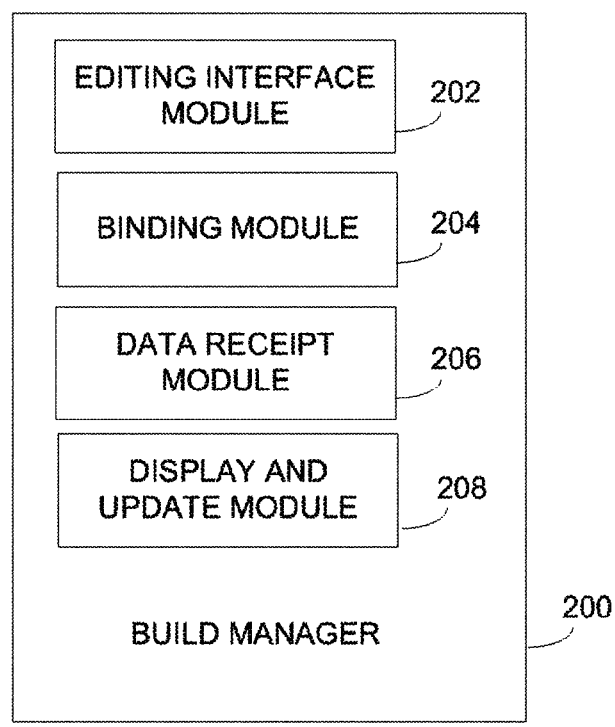
FIG. 2 depicts the physical and logical components of a build manager according to an embodiment.

COMPONENTS: FIG. 2 is an example block diagram illustrating the physical and logical components of an interactive document build manager 200. Interactive document build manager 200 represents generally any combination of hardware and programming configured for use to build an electronic interactive document. Build manager 200 may be implemented in a number of environments, such as environment 100 of FIG. 1. In the example of FIG. 2, build manager 200 is shown to include an editing interface module 202, a binding module 204, a data receipt module 206, and a display and update module 208.

Editing interface module 202 represents generally any combination of hardware and programming configured to provide an editing interface for creation and editing of an interactive document during a design mode. As used in this specification and the appended claims, an "interactive document" means an electronic document that includes, contained within the document, interactive elements and embedded instructions to cause content and/or properties to change as the end user interacts with the document. In an embodiment, the editing interface is stored within the interactive document and includes a plurality of cells, with each cell capable of receiving user input, performing calculations and binding to another cell or a widget within the document. In an embodiment, the cells are arranged in a spreadsheet-like two-dimensional grid layout with named or labeled rows and columns. The spreadsheet-like format is helpful to business users, who may have experience using traditional spreadsheet applications such as Microsoft Excel® and will facilitate a utilization of the editing interface during the design mode to define formulas and relationships between cells, and relationships between cells and widgets of the document to be created or modified. In an embodiment, each cell is capable of being simultaneously bound to a plurality of widgets and a group of other cells.

As used in this specification and the appended claims, a "design mode" means a mode, time or period during which the interactive active document is being created, generated or modified by a designer user that is constructing the architecture of the document, including creating the instructions that define the functional logic for the interactive components. In an example relating to the insurance industry documentation, in a design mode a designer user may create an interactive document that will be used, with defined editing rights, by an end user who may be an insurance agent in the field. Design mode is to be distinguished from a "production mode". As used in this specification and the appended claims, a "production mode" means a mode, time or period during which the document is open and operable to be interacted with by an end user that is using the document for an ultimate intended purpose. As used in this specification, a "designer user" means a user during a design mode. As used in this specification, an "end user" means a user during a production mode. Returning to the above insurance industry documentation example, in production mode an end user that is an insurance agent in the field may utilize the interactive document for an intended purpose of creating customized insurance applications for the agent's customers. The production mode end user may have a limited ability to add content, omit content, and or otherwise modify the document, to the extent permitted by rules established by the designer user during the design mode.

As used in this specification and the appended claims, a "widget" means an element of an interactive document that is operable to be bound to data and that is changeable by a user of the document during a production mode. Such an element is also sometimes referred to as an "interactive control". In this application, "widget" and "interactive control" are used synonymously. The widget provides an interaction point for direct manipulation of certain data by the end user. Examples of widgets include interactive text fields, list boxes, dropdown lists, table controls or interfaces. Other examples of widgets include interactive buttons, charts, sections, labels, containers, checkboxes, and images. In an embodiment a designer user may define his or her own widgets and integrate them into a widget library.

Binding module 204 represents generally any combination of hardware and programming configured to receive an instruction to cause binding of a widget within the document to a first cell that is one of the plurality of cells included within the editing interface. As used in this specification and the appended claims "binding" means specifying, tying, or linking of a first object to a second object via computer-readable instructions contained with the document. In an embodiment, the binding of the widget to the first cell may be via an address or reference, stored at the widget, of a particular cell at the editing interface. In an embodiment, the cell is identified by a row and column address that shows the cell's location in the editing interface's two dimensional grid. In an embodiment, the instruction to cause binding of the widget to the first cell is received as user input via a binding tool, the binding tool displayed as part of the editing interface during the design mode. In an embodiment, an instruction is received that causes an additional binding of the first cell to an external data source. As used in this specification and the appended claims, an "external data source" means a data source that is external to the interactive document. In embodiments, the first cell and the widget are bidirectionally bound, and/or the first cell and the external data source may be bidirectionally bound. For purposes of this specification, "bidirectionally bound" means bound in a manner to permit data flow in two directions.

Data receipt module 206 represents generally any combination of hardware and programming configured to receive first data at the first cell. In an example, the first data may be received at the first cell via designer user input during the design mode. The received designer user input may be input that was made via a keyboard or other user interface device. Alternatively, the designer user input may be received via "copy and paste", "cut and paste", "drag and drop" or other input techniques that utilize a mouse or other interface to device to mark existing content and copy or move that existing content into the first cell. In another example, the first data may be received at the first cell via population of the first cell with data from an external data source that is bound to the first cell.

Display and update module 208 represents generally any combination of hardware and programming configured to, during a production mode, display a view of the document and provide updates to the view, cells and/or widgets in response to changed data. For purposes of this specification and the appended claims, a "view" means a display or presentation that can be presented to an end user during the production mode. Presentation of the view during the production mode may be via a display device, a projection device, or by an other means of presenting a visual display of an electronic document. It should be noted that it is also possible to present a view of the document during the design mode, with such design mode view being a preview of what will be displayed during the production mode if there are no further changes to the document during the design mode. When it is detected data within the widget is changed during the production mode via user input at the widget, the first cell is updated to reference the changed data. When it is detected data within the first cell is changed during the production mode for a reason other than user input at the widget (e.g., a change due to a calculation made at the first cell or as a result of repopulation of the first cell with data from an external data source), the widget is updated to reference the changed data. In an embodiment, when data within the first cell changes for any reason, all other cells or widgets that are bound to the first cell are updated.

Throughout this specification references are made to "a widget" and a "first cell". It should be noted that in an embodiment a widget may contain multiple fields each of which is bound to a cell of the editing interface, such that the widget may be bound to a group of cells. In other embodiments, a particular cell may be simultaneously bound to a plurality of widgets, such that a change to data at any one of the widgets causes changes to that cell, and to each of the plurality of widgets bound to that cell.

Figure 3:
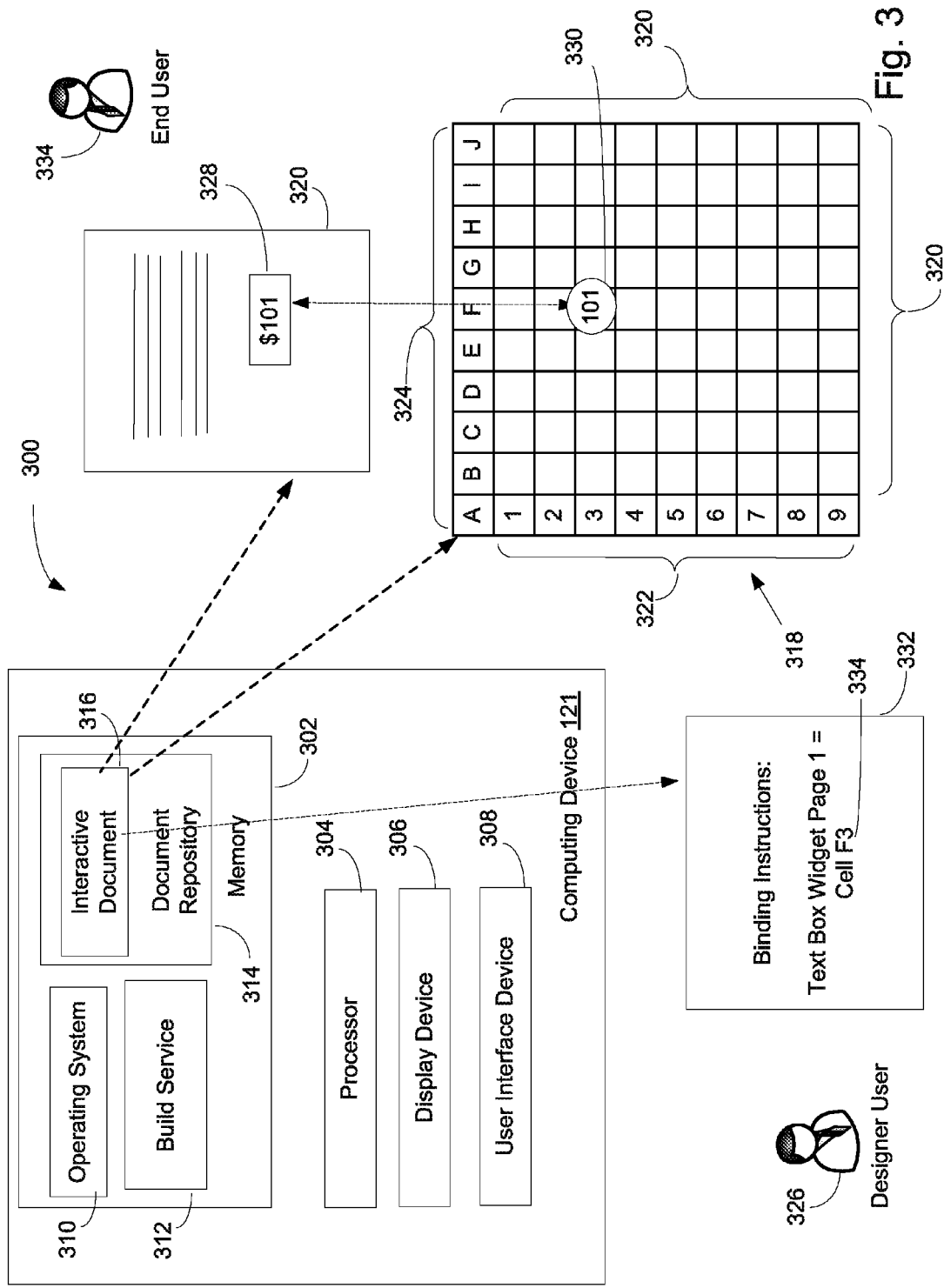
FIGS. 3-5 depict example build services according to embodiments.

Build manager 200 may be implemented in a number of environments, such as environment 300 of FIG. 3. Environment 300 includes a computing device 121, which includes a memory 302, a processor 304, a display device 306 and a user interface device 308. In a given implementation, memory 302 may represent multiple memories, and processor 304 may represent multiple processors. In an embodiment, the computer device 121 may include a number of software components that are stored in a computer-readable medium, such as memory 302, and are executable by processor 304. In this respect, the term "executable" includes a program file that is in a form that can be directly (e.g., machine code) or indirectly (e.g., source code that is to be compiled) performed by the processor 304. An executable program may be stored in any portion or component of memory 302.

Memory 302 is shown to include operating system 310, build service 312, and document repository 314. Operating system 310 represents generally any software platform on top of which other programs or applications such as build service 312 run. Examples include Linux® and Microsoft® Windows. Document repository 314 represents generally a collection of electronic interactive documents stored in memory 302. In this example, the document repository holds a single interactive document 316, but could hold a plurality of interactive documents.

Build service 312 represents generally any programming, that, when executed, implements the functionality of the build manager 200 of FIG. 2. In particular, build service 312, when executed by processor 304, is responsible for providing an editing interface 318 for creation and editing of an interactive document 316 during a design mode. In this embodiment, the editing interface 318 is provided via display device 306. Display device 306 may be a monitor, a projection device, or another means of presenting a visual display of the electronic document 316.

In this embodiment, the editing interface 318 is stored within the interactive document 316 and includes a plurality of cells 320, with each cell capable of receiving user input, performing calculations and binding to another cell or a widget within the document. In an embodiment, the cells 320 are arranged in a spreadsheet-like layout. In an embodiment the layout comprises a two-dimensional grid with named or labeled rows 322 and columns 324. In an embodiment, each cell is capable of being simultaneously bound to a plurality of widgets and a group of other cells.

An instruction is received from a designer user 326 to cause binding of a widget 328 within the document to a first cell 330 that is one of the plurality of cells 320 included within the editing interface 318. Binding of the widget 328 to the first cell 330 may be via a "Column F, Row 3" or "Cell F3" address or reference 334, stored at or as a part of the widget 328. The instruction to cause binding of the widget 328 to the first cell 330 can be received as designer user 326 input via a binding tool 330, the binding tool 332 displayed as part of the editing interface 318 during the design mode. In an embodiment, the binding of the first cell 330 to the widget 328 may occur by virtue of the designer user 326 typing in the first cell's address or reference 334 into the binding tool 332 utilizing a keyboard or other user interface device 308. In another embodiment, the binding may occur via a designer user 326 utilizing a mouse, stylus, or other user interface device 308 to highlight the first cell 330 in the spreadsheet-like editing interface 318, which action causes the first cell's address or reference 334 to appear in the binding tool 332 and causes binding to occur between the first cell 330 and the widget 328. In some embodiments, the functionality of the display device 306 and the user interface device 308 may be combined in a single device, e.g., a touchscreen device.

In this example, first data "101" is received at the first cell 330 via designer user 326 input into the first cell 330 during a design mode. The first data "101" is designer user 326 input received via a keyboard or other user interface device 308. Alternatively, the designer user input may received via "copy and paste", "cut and paste", "drag and drop" or other input techniques that utilize a mouse or other user interface device to device to mark existing content and copy or move that existing content into the first cell 330. It should be noted that the first data 330 in this example is numerical text, but in other examples the first data that is received may be in the form of letter text, a formula, an address to an external data source or other data.

During a production mode, a view 320 of the document 316 is displayed to an end user 334 via display device 306. When it is detected that data within the widget 328 is changed during the production mode via end user 334 input at the widget 328, the first cell 330 is updated to reference the changed data. When it is detected data within the first cell 330 is changed during the production mode for a reason other than end user 334 input at the widget 328 (e.g., a change due to a calculation made at the first cell 330), the widget 328 is updated to reference the changed data. When data within the first cell 330 changes for any reason, other cells or widgets that are bound to the first cell 330 are updated to reflect the new data.

Figure 4:
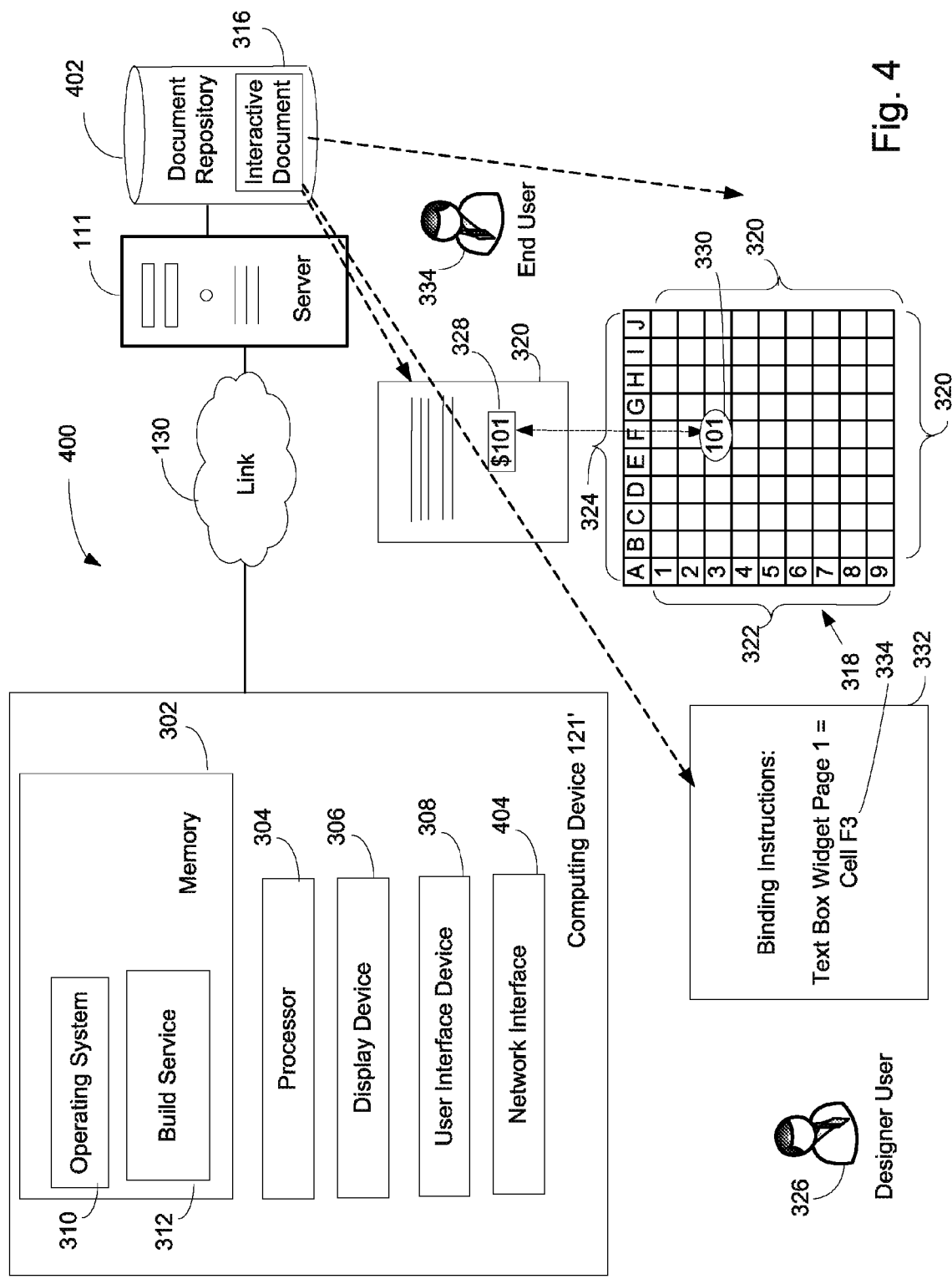

Build manager 200 may also be implemented in an environment such as environment 400 of FIG. 4. Environment 400 is substantially the same as environment 300 of FIG. 3, with the exceptions noted in paragraphs [00034] and [00035] below.

In the embodiment displayed in FIG. 4, computing device 121' does not include a document repository as does computing device 121 of FIG. 3. Instead, in FIG. 4 a document repository 402 that holds interactive document 316 is presented as a database external to computing device 121'. Document repository 402 may be accessible to computing device 121 via electronic link 130, or via link 130 and a server 111 dedicated to controlling access to document repository 402.

Computing device 121' of FIG. 4 includes network interface 404, representing generally any combination of hardware and programming configured for electronically connecting computing device 121' to link 130. In an embodiment, the network interface 404 may comprise a network interface card, a network adapter, a network interface controller, and or a LAN adapter. Network requests may be sent and received utilizing a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP").

With the exceptions noted in paragraphs [00034] and [00035], the descriptions of the FIG. 3 computing device 121, editing interface 318, view 320, design user 326, binding tool 332, and end user 334, and any numerically referenced subcomponents, are to be applied to the FIG. 4 computing device 121', editing interface 318, view 320, design user 326, binding tool 332, and end user 334, and their numerically referenced subcomponents.

Figure 5:
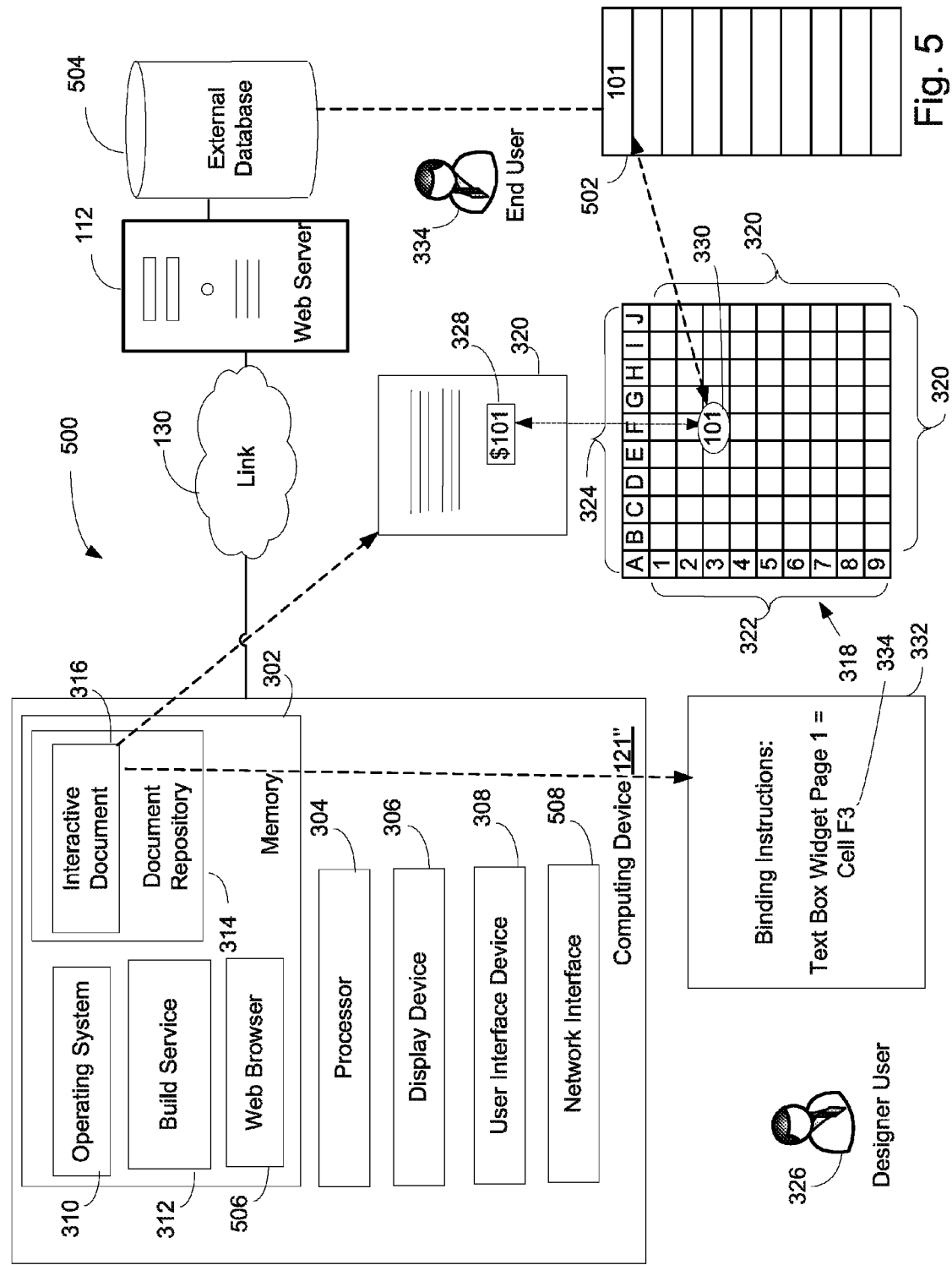

Build manager 200 may also be implemented in an environment such as environment 500 of FIG. 5. Environment 500 is substantially the same as environment 300 of FIG. 3, with the exceptions noted in paragraphs [00038] and [00039] below.

In the example of FIG. 5, first cell 330 is populated with the numeric value "101" by virtue of cell 330 being bidirectionally bound to an external data source 502. External data source 502 represents generally any data source that is external to the computing device 121" that runs build service 312. In this example, external data source 502 is held in memory at external database 504. Build service 312 of computing device 121", in conjunction with web browser 506 of computing device 121", communicates via the Internet or an intranet with web server 112 to cause binding of the first cell 330 with external data source 502. In the embodiment shown in FIG. 5, the external data source 502 is a database table accessible via the Internet or an intranet. In other embodiments, the external data source may be a data source within an XML file or other document.

Web browser 506 represents generally any combination of hardware and programming configured to retrieve, present, and traverse information over the Internet or an intranet. Network Interface 508 represents generally any combination of hardware and programming configured for electronically connecting computing device 121" to link 130. In an embodiment, the network interface 508 may comprise a network interface card, a network adapter, a network interface controller, and/or a LAN adapter.

With the exceptions noted in paragraphs [00038] and [00039], the descriptions of the FIG. 3 computing device 121, editing interface 318, view 320, design user 326, binding tool 332, and end user 334, and any numerically referenced subcomponents, are to be applied to the FIG. 5 computing device 121", editing interface 318, view 320, design user 326, binding tool 332, and end user 334, and their numerically referenced subcomponents.

In the foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 6:
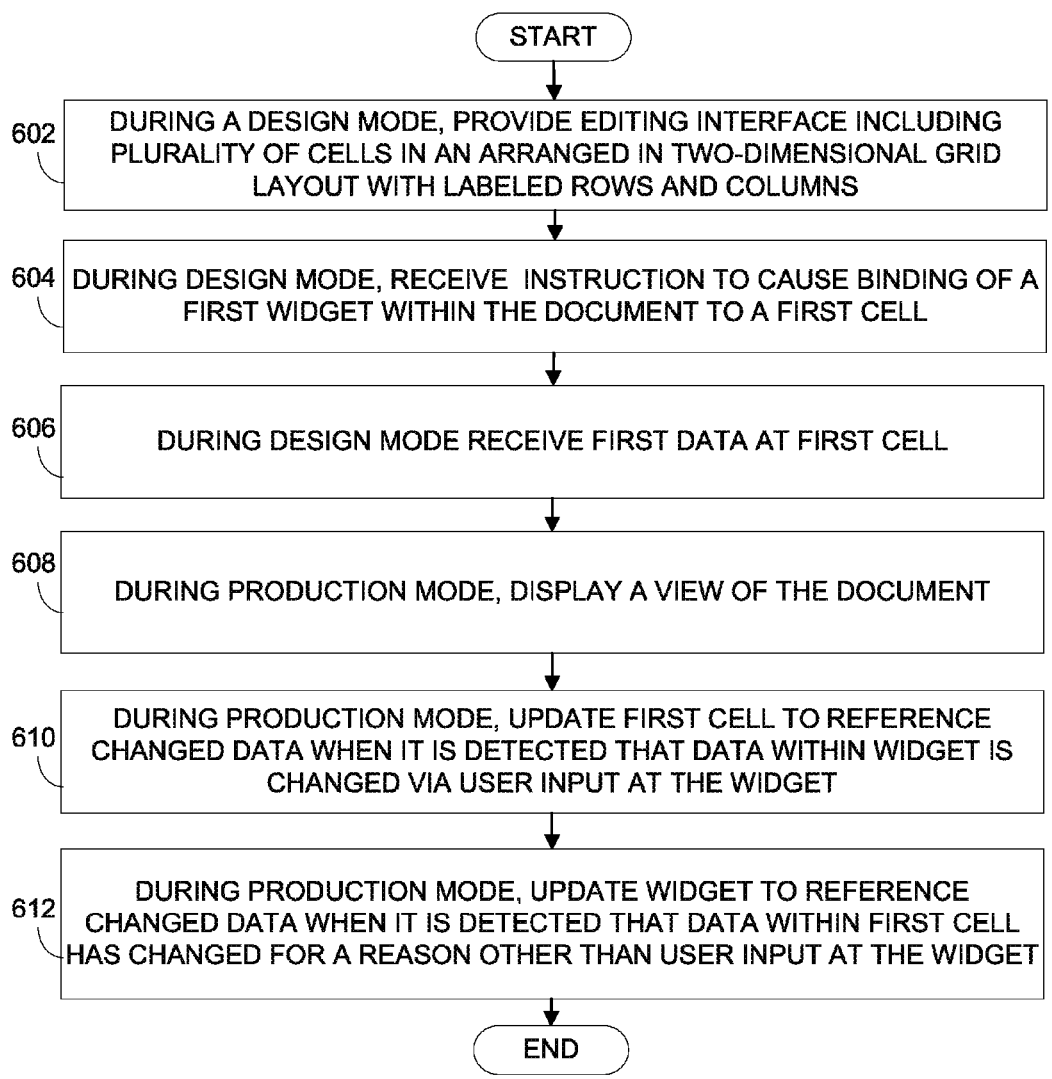
FIGS. 6 and 7 are example flow diagrams depicting embodiments of a method to build an interactive document.
Figure 7:
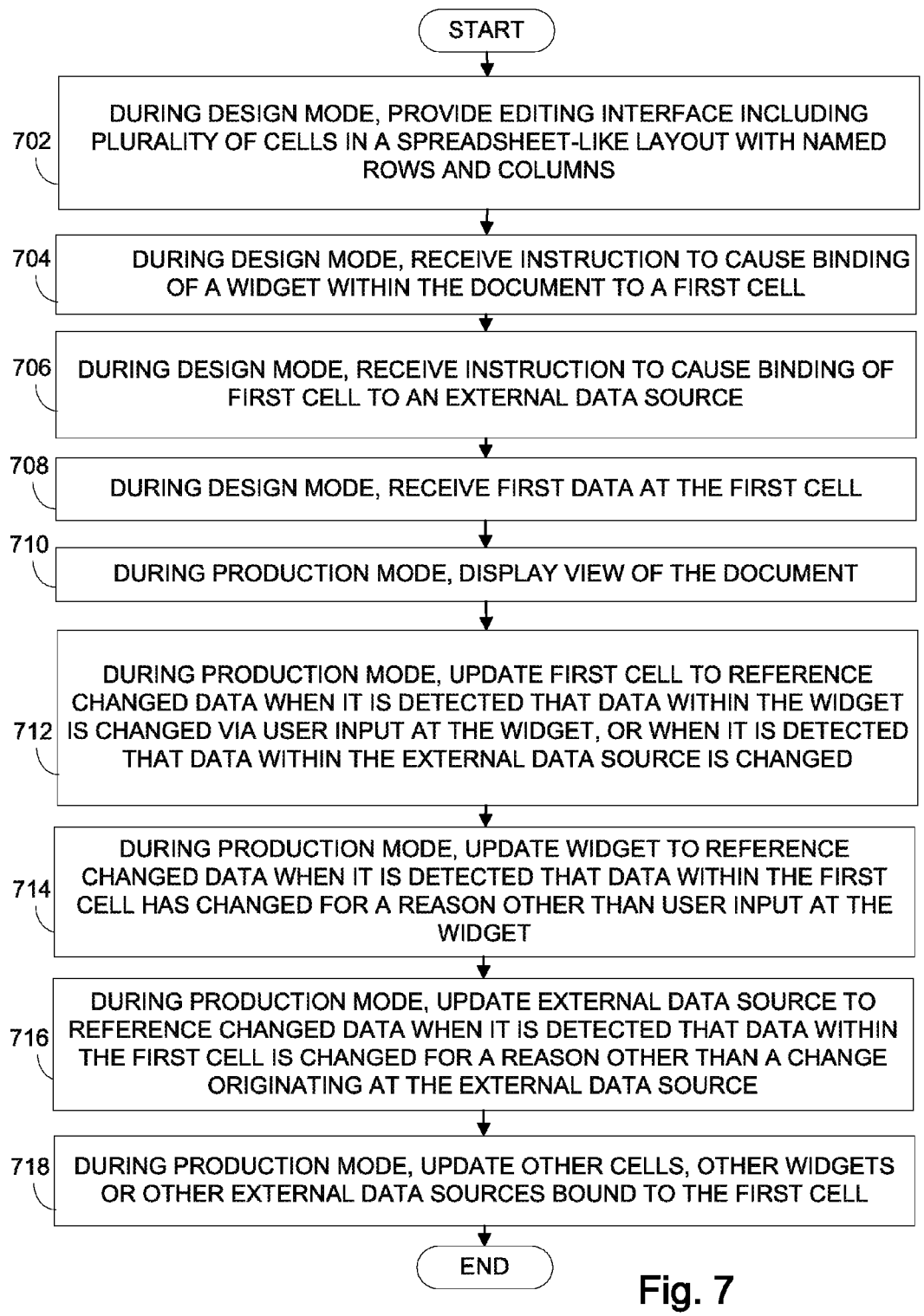

OPERATION: FIGS. 6 and 7 are flow diagrams depicting example embodiments of a method to build an interactive document. In discussing FIGS. 6 and 7, reference may be made to the diagrams of FIGS. 1-5 to provide contextual examples. Implementation, however, is not limited to those examples.

Starting with FIG. 6, during a design mode, an editing interface including plurality of cells arranged in a two-dimensional grid layout with labeled rows and columns is provided (block 602). Referring back to FIG. 2, the editing interface module 202 may be responsible for implementing block 602.

Continuing with the flow diagram of FIG. 6, during the design mode, an instruction is received to cause binding of a widget to a first cell (block 604). Referring back to FIG. 2, the binding module 204 may be responsible for implementing block 604.

Continuing with the flow diagram of FIG. 6, during the design mode first data is received at the first cell (block 606). Referring back to FIG. 2, the data receipt module 206 may be responsible for implementing block 606.

Continuing with the flow diagram of FIG. 6, during a production mode, a view of the document is displayed (block 608). During the production mode, the first cell is updated to reference changed data when it is detected that data within widget is changed via user input at the widget (block 610). During the production mode, the widget is updated to reference changed data when it is detected that data within first cell has changed for a reason other than user input at the widget (block 612). Referring back to FIG. 2, the display and update module 208 may be responsible for implementing blocks 608, 610, and 612.

Moving on to FIG. 7, during a design mode, an editing interface is provided, the interface including a plurality of cells arranged in a spreadsheet-like layout with named rows and columns (block 702). Referring back to FIG. 2, the editing interface module 202 may be responsible for implementing block 702.

Continuing with the flow diagram of FIG. 7, during the design mode an instruction is received to cause binding of a widget within the document to a first cell (block 704). Referring' back to FIG. 2, the binding module 204 may be responsible for implementing block 704.

Continuing with the flow diagram of FIG. 7, during the design mode an instruction is received to cause binding of the first cell to an external data source (block 706). Referring' back to FIG. 2, the binding module 204 may be responsible for implementing block 706.

Continuing with the flow diagram of FIG. 7, during the design mode first data is received at the first cell (block 708). Referring' back to FIG. 2, the data receipt module 206 may be responsible for implementing block 708.

Continuing with the flow diagram of FIG. 7, during a production mode, a view of the document is displayed (block 710). During the production mode, the first cell is updated to reference changed data when it is detected that data within the widget is changed via user input at the widget, or when it is detected that data within the external data source is changed (block 712). During the production mode, the widget is updated to reference changed data when it is detected that data within the first cell has changed for a reason other than user input at the widget (block 714). For example, the widget may be updated, along with the first cell, when it is detected that data within the external data source is changed. During the production mode, the external data source is updated to reference changed data when it is detected that data within the first cell is changed for a reason other than a change originating at the external data source (block 716). During the production mode, other cells, other widgets or other external data sources that are bound to the first cell are updated (block 718). Referring' back to FIG. 2, the display and update module 208 may be responsible for implementing blocks 710, 712, 714, 716 and 718.

Figure 8:
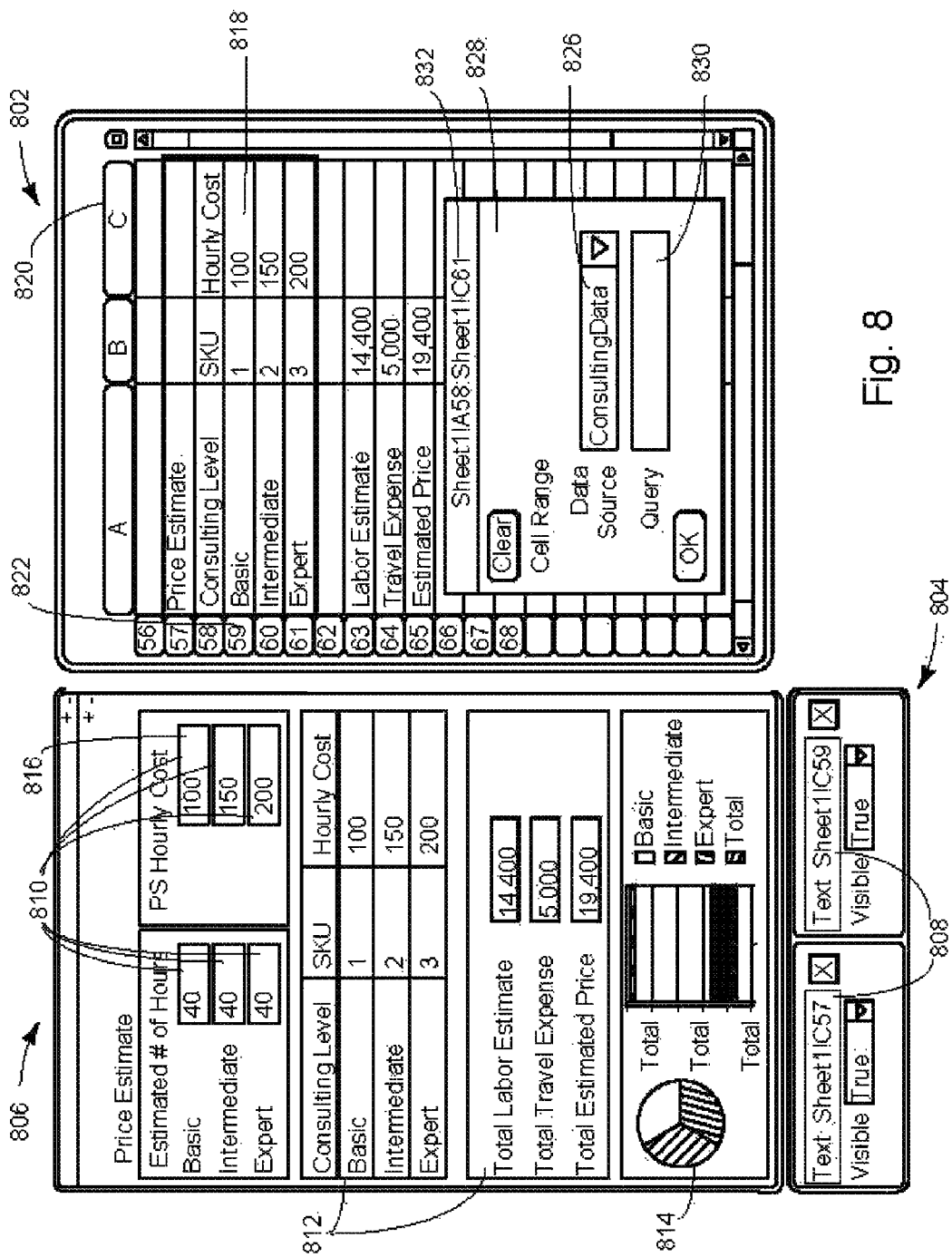
FIG. 8 is an example display that may be presented during a design mode, according to an embodiment.

EXAMPLES: FIG. 8 is an example screen shot of a display that may be presented, according to one embodiment, during a design mode to a designer user that is building an interactive document. In the embodiment illustrated in FIG. 8, an editing interface 802, a binding tool 804 and a view 806 of an interactive document are displayed on a single screen or presentation via a display device. The editing interface 802 comprises a plurality of cells arranged in a spreadsheet-like two-dimensional grid layout with labeled rows and columns. The binding tool 804, when associated with a particular widget in the interactive document, provides binding address boxes 808 at which a design user may insert a reference to one or more cells of the editing interface 802. The view 806 represents how the interactive document will appear to an end user during a production mode if there are no more changes by the designer user.

In this example, the document visible in the view 806 is a "Price Estimate" that includes a plurality of interactive controls or widgets 810. The document additionally contains a table 812 and a pie chart 814 that are bound to, and created utilizing, data associated with widgets. A first interactive text widget 816 within the document represents an "PS Hourly Cost" for a "Basic Consulting Level". The first widget 816 has been populated with text data "100", and is bidirectionally bound to a first cell 818 labeled or named "cell C59" that is visible to the designer user via the editing interface 802. ("C" represents the column 820 and "59" represents the row 822 of the editing interface 802 at which the first cell 818 is situated.)

Figure 9:
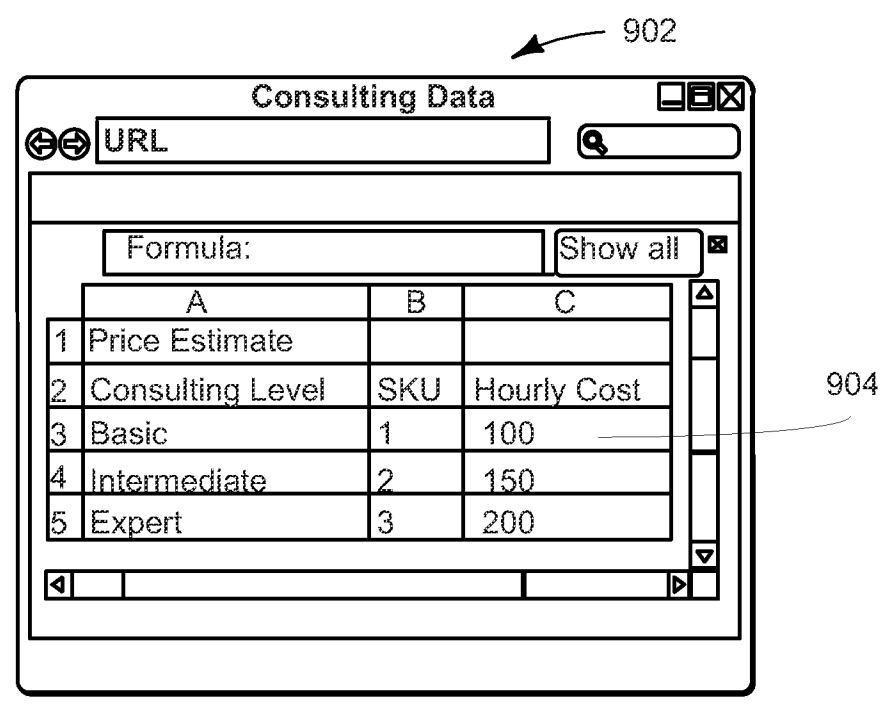

The initial value of the first cell 818 "C59" was populated to the editing interface 802 from an external data source 902 (FIG. 9). An address 826 for the external data source 902 was specified by the design user at a pop up window 828 that is part of the editing interface 802. The address "Consulting Data" for the external data source 902 is stored in the document as rnetadata. The pop up window may additionally display a query 830 to define a subset of the data available at external data source 902. In this example, the designer user has identified that the external data source 902 (in this example a traditional spreadsheet accessible via the web) is to be bound to cell range "Sheet1!A58:Sheet1!C61" 832 of the user interface. As a result of this binding first cell 818 "C59" is bidirectionally bound to block "C3" 904 (FIG. 9) of the external data source 902, as well as being bidirectionally bound to the first widget 816.

FIG. 9 illustrates the external data source 902, which in this example is a web-accessible spreadsheet generated via a designer user's query to an external database. In this example, the external data source 902 is named "Consulting Data" and is a table of data that may be a subset of the total data available at the database. As the designer user has bound first cell 818 "C59" (FIG. 8) to the external data source 902, the first cell 818 in the editing interface 802 (FIG. 8) is populated via the external data source 902. The first cell 818 in turn defines the first widget 816 (FIG. 8) as "100" such that "100" can be displayed at the first widget 816 during a production mode view. Bindings of the first widget 816 to the first cell 818, and of the first cell 818 to the external data source 902, are bidirectional. Accordingly, if an end user enters a different value in at the first widget 816 during a production mode, first cell 818 "C59" will be updated with the new value, as will block "C3" 904 of the external data source 902.

CONCLUSION: The diagram of FIG. 1 is used to depict an example environment in which various embodiments may be implemented. Implementation, however, is not so limited. FIGS. 2-5 show the architecture, functionality, and operation of various embodiments. Various components illustrated in FIGS. 2-5 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIGS. 6 and 7 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A non-transient computer-readable storage medium containing instructions to build an interactive document that, when executed, cause a computer to:

during a design mode,
provide an editing interface including a plurality of cells arranged in a two-dimensional grid layout with labeled rows and columns, the editing interface having an address for an external data source specified by a design user at a pop up window that is part of the editing interface, the address stored in the interactive document as metadata;
provide a binding tool;
provide a view of the interactive document as the interactive document will appear during a production mode,
the editing interface, the binding tool, and the view of the interactive document displayed on a single screen during the design mode;
receive an instruction to cause the binding tool to bind a widget within the interactive document to a first cell in the editing interface,
the widget accessed from a widget library;
receive first data at the first cell; and
during the production mode, display a view of the document and
update the first cell to reference changed data when it is detected that data within the widget is changed via user input at the widget, and
update the widget to reference changed data when it is detected that data within the first cell has changed for a reason other than user input at the widget.

2. The medium of claim 1, wherein each cell of the plurality is capable of receiving user input, performing calculations and binding to another cell or a widget within the document.

3. The medium of claim 1, wherein each cell is capable of being simultaneously bound to a plurality of widgets.

4. The medium of claim 1, further comprising updating other widgets or other cells bound to the first cell when the data within the first cell changes.

5. The medium of claim 1, wherein the first cell and the widget are bidirectionally bound, and the first cell and an external data source are bidirectionally bound.

6. The medium of claim 1, further comprising updating other cells or other widgets bound to the first cell.

7. The medium of claim 1, wherein the editing interface is stored within the document.

8. The medium of claim 1, wherein the widget is selected from the widget library including, interactive buttons, charts, sections, labels, containers, checkboxes, and images.

9. The medium of claim 1, wherein the widget is selected from a user defined widget stored in the widget library.

10. The medium of claim 1, wherein the pop up window additionally displays a query to define a subset of data available at external data source.

11. A system to build an electronic interactive document, the system including modules stored on a non-transient computer-readable storage medium and executable by a processor, the system comprising:
    an editing interface module, operable to during a design mode, provide an editing interface including a plurality of cells arranged in a two-dimensional grid layout with named rows and columns, the editing interface having an address for an external data source specified by a design user at a pop up window that is part of the editing interface, the address in the interactive document as metadata;
    a binding module, operable to during the design mode, receive an instruction to cause binding of a widget to a first cell, the widget stored in a widget library;
    a view module showing the interactive document as the interactive document will appear during a production mode;
    the editing interface, the binding, module, and the view of the interactive document displayed on a single screen during the design mode;
    a data receipt module, operable to during the design mode, receive first data at the first cell; and
    a display and update module, operable to, during the production mode, display a view of the document and
        update the first cell to reference changed data when it is detected that data within the widget is changed via user input at the widget, and
        update the widget to reference changed data when it is detected that data within the first cell has changed for a reason other than user input at the widget.

12. The system of claim 11, wherein each cell of the plurality is capable of receiving user input, performing calculations and binding to another cell or a widget within the document.

13. The system of claim 11, wherein each cell is capable of being simultaneously bound to a plurality of widgets.

14. The system of claim 11, further comprising updating other widgets or other cells bound to the first cell when the data within the first cell changes.

15. The system of claim 11, wherein the editing interface further comprises a binding tool to receive user input and cause binding of a widget to a cell, and wherein the instruction is received via the binding tool.

16. The system of claim 11, wherein the first cell is additionally hound to an external data source accessible via Intranet or an intranet, and further comprising further comprising updating the first cell and the widget to reference changed data when it is detected that data within the external data source is changed.

17. The system of claim 16, wherein the first cell and the widget are bidirectionally bound, and the first cell and the external data source are bidirectionally bound.

18. The system of claim 11, wherein the editing interface is stored within the document.

19. A method to build an interactive document, the method comprising:
    during a design mode,
        providing an editing interface including a plurality of cells arranged in a spreadsheet-like layout with named rows and columns, wherein each cell of the plurality is capable of receiving user input, performing calculations and binding to another cell, a widget within the document, or an external data source, the editing interface having an address for an external data source specified by a design user at a pop up window that is part of the editing interface, the address stored in the interactive document as metadata,
        providing a binding tool to receive user input and cause binding of a widget to a cell, the widget being from a widget library,
        a view showing the interactive document as the interactive document will appear during a production mode;
        the editing interface, the binding tool, and the view showing the interactive document, all displayed on a single screen during the design mode;
        receiving an instruction via the binding tool to cause binding of a widget to a first cell,
        receiving an instruction to cause binding of the first cell to an external data source,
        receiving first data at the first cell; and
    during the production mode, displaying a view of the document and
        updating the first cell to reference changed data when it is detected that data within the widget is changed via user input at the widget, and
        updating the widget to reference changed data when it is detected that data within the first cell has changed for a reason other than user input at the widget, and
        updating the first cell and the widget to reference the changed data when it is detected that data within the external data source is changed, and
        updating other cells or other widgets bound to the first cell.

* * * * *

UNITED STATES PATENT AND TRADEMARK OFFICE
CERTIFICATE OF CORRECTION

PATENT NO.        : 8,924,842 B2                                             Page 1 of 1
APPLICATION NO.   : 13/035737
DATED             : December 30, 2014
INVENTOR(S)       : Ronald Lee Heiney et al.

It is certified that error appears in the above-identified patent and that said Letters Patent is hereby corrected as shown below:

In the Claims

In column 11, line 14 approx., in Claim 8, delete "including," and insert -- including --, therefor.

In column 11, line 32, in Claim 11, delete "in" and insert -- stored in --, therefor.

In column 11, line 34, in Claim 11, delete "to" and insert -- to, --, therefor.

In column 11, line 40, in Claim 11, delete "binding," and insert -- binding --, therefor.

In column 12, line 9 approx., in Claim 16, delete "hound" and insert -- bound --, therefor.

Signed and Sealed this
Fifteenth Day of September, 2015

Michelle K. Lee
*Director of the United States Patent and Trademark Office*